(12) United States Patent
Ogawa et al.

(10) Patent No.: US 9,628,017 B2
(45) Date of Patent: Apr. 18, 2017

(54) MOTOR CONTROL DEVICE, AND MOTOR CONTROL METHOD

(71) Applicants: Yasufumi Ogawa, Tokyo (JP); Keiichi Enoki, Tokyo (JP); Nobuhide Mori, Tokyo (JP); Hiroyuki Kobayashi, Hyogo (JP)

(72) Inventors: Yasufumi Ogawa, Tokyo (JP); Keiichi Enoki, Tokyo (JP); Nobuhide Mori, Tokyo (JP); Hiroyuki Kobayashi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 14/429,184

(22) PCT Filed: Oct. 11, 2012

(86) PCT No.: PCT/JP2012/076323
§ 371 (c)(1),
(2) Date: Mar. 18, 2015

(87) PCT Pub. No.: WO2014/057558
PCT Pub. Date: Apr. 17, 2014

(65) Prior Publication Data
US 2015/0222216 A1 Aug. 6, 2015

(51) Int. Cl.
*H02P 21/00* (2016.01)
*H02P 29/00* (2016.01)
(Continued)

(52) U.S. Cl.
CPC ............ *H02P 29/0083* (2013.01); *B60L 3/12* (2013.01); *H02P 29/02* (2013.01); *H02P 29/662* (2016.11);
(Continued)

(58) Field of Classification Search
CPC ..... H02P 21/0035; H02P 21/06; Y02T 10/643
(Continued)

(56) References Cited

U.S. PATENT DOCUMENTS 7,319,300 B2 * 1/2008 Hahn .................. H02P 6/28
318/400.08
7,342,378 B2 * 3/2008 Sakamoto ............ H02P 25/03
318/700

(Continued)

FOREIGN PATENT DOCUMENTS

CN 101192779 A 6/2008
EP 2 472 716 A1 7/2012
(Continued)

OTHER PUBLICATIONS

International Search Report of PCT/JP2012/076323, dated Dec. 11, 2012. [PCT/ISA/210].
(Continued)

*Primary Examiner* — Rina Duda
(74) *Attorney, Agent, or Firm* — Sughrue Mion, PLLC; Richard C. Turner

(57) ABSTRACT

In order to highly accurately estimate a temperature of a permanent magnet to be used for a rotor of a motor, provided is a motor control device for a vehicle including a motor as a drive power source, in which an estimation mode setting section sets, when a predetermined condition for estimating the temperature of the permanent magnet to be used for the rotor of the motor is established under a state in which the motor generates drive power to run the vehicle, a current flowing through the motor to 0, and a permanent magnet temperature estimation section estimates the temperature of the permanent magnet based on an induced voltage of the motor in a period during which the current flowing through the motor is 0.

11 Claims, 7 Drawing Sheets

(51) Int. Cl.
*B60L 3/12* (2006.01)
*H02P 29/02* (2016.01)
*H02P 29/66* (2016.01)
*H02P 29/60* (2016.01)

(52) U.S. Cl.
CPC ......... *H02P 29/67* (2016.11); *B60L 2240/425* (2013.01); *B60L 2240/427* (2013.01); *B60L 2260/44* (2013.01); *Y02T 10/642* (2013.01)

(58) Field of Classification Search
USPC ............... 318/471, 400.02, 459, 500, 400.34
See application file for complete search history.

(56) References Cited

U.S. PATENT DOCUMENTS

| | | | | |
|---|---|---|---|---|
| 7,804,261 B2* | 9/2010 | Atarashi | ................... | H02P 6/00 318/139 |
| 2005/0247073 A1 | 11/2005 | Hikawa et al. | | |
| 2009/0174351 A1* | 7/2009 | Eisenhardt | .......... | H02P 29/0241 318/400.21 |

FOREIGN PATENT DOCUMENTS

| | | | |
|---|---|---|---|
| JP | 2002-10677 | A | 1/2002 |
| JP | 2003-235286 | A | 8/2003 |
| JP | 2004-201425 | A | 7/2004 |
| JP | 4572907 | B2 | 11/2010 |

OTHER PUBLICATIONS

Communication dated Aug. 25, 2016, from the State Intellectual Property Office of People's Republic of China in counterpart Application No. 201280076360.9.

* cited by examiner

MOTOR CONTROL DEVICE, AND MOTOR CONTROL METHOD

CROSS REFERENCE TO RELATED APPLICATIONS

This application is a National Stage of International Application No. PCT/JP2012/076323 filed Oct. 11, 2012, the contents of all of which are incorporated herein by reference in their entirety.

TECHNICAL FIELD

The present invention relates to a motor control device and a motor control method for estimating a temperature of a permanent magnet to be used for a rotor of a motor.

BACKGROUND ART

In recent years, in order to reduce the amount of $CO_2$ emissions, there are an increasing number of electrically driven vehicles, such as a hybrid vehicle having a motor and an engine mounted thereon and an electric vehicle configured to be driven only with a motor. Those electrically driven vehicles having the motors mounted thereon each include, in addition to the motor, an inverter for driving the motor, a battery serving as a power supply, and the like.

Further, in those electrically driven vehicles, in order to improve the output of the motor, developments have been made to use a high battery voltage and to increase the battery voltage with a boost converter. In addition, in those electrically driven vehicles, development has been made to improve performance of a cooling function in order to prevent a temperature of the motor from being high even after long-term use.

However, when the motor generates drive power to run the vehicle, for example, if the motor is used in a high output state for a long time on a mountainous highway or the like, a temperature of a stator or a rotor rises to reach an upper limit value. In this case, a permanent magnet to be used for the rotor is demagnetized when its temperature exceeds the upper limit value, resulting in a problem in that motor torque is reduced.

For protection against this situation, countermeasures are taken to mount a temperature sensor such as a thermistor on the stator. On the other hand, it is difficult to mount a temperature sensor such as a thermistor on the permanent magnet to be used for the rotor because the permanent magnet is a rotating portion, resulting in a problem in that the temperature of the permanent magnet cannot be measured.

In order to solve such problems, there has been proposed a motor control device configured to estimate a temperature of a permanent magnet based on a temperature of a stator coil detected by stator temperature detection means, a fluid temperature of a coolant, a thermal resistance ratio as the ratio of a thermal resistance between the coolant and the stator coil and a thermal resistance between the stator coil and the permanent magnet, and a heat generation ratio (heat dissipation characteristics) between the stator coil and the permanent magnet (see, for example, Patent Literature 1).

Further, there has been proposed a motor temperature estimation device configured to estimate a temperature of a permanent magnet based on a basic formula of a motor by using a voltage applied to the motor, a current flowing through the motor, and a model formed of a resistance and an inductance that are motor constants (to estimate the temperature by using temperature characteristics of permanent magnet magnetic flux) (see, for example, Patent Literature 2).

CITATION LIST

Patent Literature

[PTL 1] JP 4572907 B2
[PTL 2] JP 2004-201425 A

SUMMARY OF INVENTION

Technical Problems

The related art, however, has the following problems.

In the motor control device disclosed in Patent Literature 1, a temperature rise amount calculated from respective parameters is added to a temperature of the permanent magnet detected in a previous calculation cycle, to thereby estimate the temperature of the permanent magnet. In this case, for example, the heat generation ratio between the stator coil and the permanent magnet varies depending on the atmospheric temperature, the speed of the vehicle, and the like, and hence the calculated temperature rise amount is a value containing an error.

Thus, the error of temperature estimation is integrated each time the temperature rise amount is calculated, resulting in a problem in that the error increases with time. Therefore, when the motor control device disclosed in Patent Literature 1 is applied to a vehicle, the error becomes larger during long-term running, resulting in a problem in that the output needs to be suppressed with a large margin.

In the motor temperature estimation device disclosed in Patent Literature 2, when the temperature of the permanent magnet is estimated, the model formed of the resistance and the inductance that are the motor constants is used, and hence the influence such as fluctuations in motor constants among motors is large, resulting in a problem in that a large error occurs between the estimated temperature and the actual temperature.

The present invention has been made in order to solve the above-mentioned problems, and it is an object thereof to provide a motor control device and a motor control method capable of highly accurately estimating a temperature of a permanent magnet to be used for a rotor of a motor.

Solution to Problems

According to one embodiment of the present invention, there is provided a motor control device for a vehicle including a motor as a drive power source, the motor control device including: an estimation mode setting section configured to set, when a predetermined condition for estimating a temperature of a permanent magnet to be used for a rotor of the motor is established under a state in which the motor generates drive power to run the vehicle, a current flowing through the motor to 0; and a permanent magnet temperature estimation section configured to estimate the temperature of the permanent magnet based on an induced voltage of the motor in a period during which the current flowing through the motor is 0.

According to one embodiment of the present invention, there is provided a motor control method to be executed by a motor control device for a vehicle including a motor as a drive power source, the motor control method including: a determination step of determining whether or not a predetermined condition for estimating a temperature of a permanent magnet to be used for a rotor of the motor is established under a state in which the motor generates drive power to run the vehicle; a current control step of setting a current flowing through the motor to 0 when the predetermined condition is established; and a temperature estimation step of estimating the temperature of the permanent magnet based on an induced voltage of the motor in a period during which the current flowing through the motor is 0.

Advantageous Effects of Invention

According to the motor control device in one embodiment of the present invention, the estimation mode setting section sets, when the predetermined condition for estimating the temperature of the permanent magnet to be used for the rotor of the motor is established under the state in which the motor generates drive power to run the vehicle, a current flowing through the motor to 0, and the permanent magnet temperature estimation section estimates the temperature of the permanent magnet based on the induced voltage of the motor in the period during which the current flowing through the motor is 0.

Further, according to the motor control method in one embodiment of the present invention, in the determination step, it is determined whether or not the predetermined condition for estimating the temperature of the permanent magnet to be used for the rotor of the motor is estimated under the state in which the motor generates drive power to run the vehicle, and in the current control step, when the predetermined condition is established, the current flowing through the motor is set to 0. In the temperature estimation step, in the period during which the current flowing through the motor is 0, the temperature of the permanent magnet is estimated based on the induced voltage of the motor.

Consequently, the motor control device and the motor control method capable of highly accurately estimating the temperature of the permanent magnet to be used for the rotor of the motor can be obtained.

DESCRIPTION OF EMBODIMENT

Figure 1:
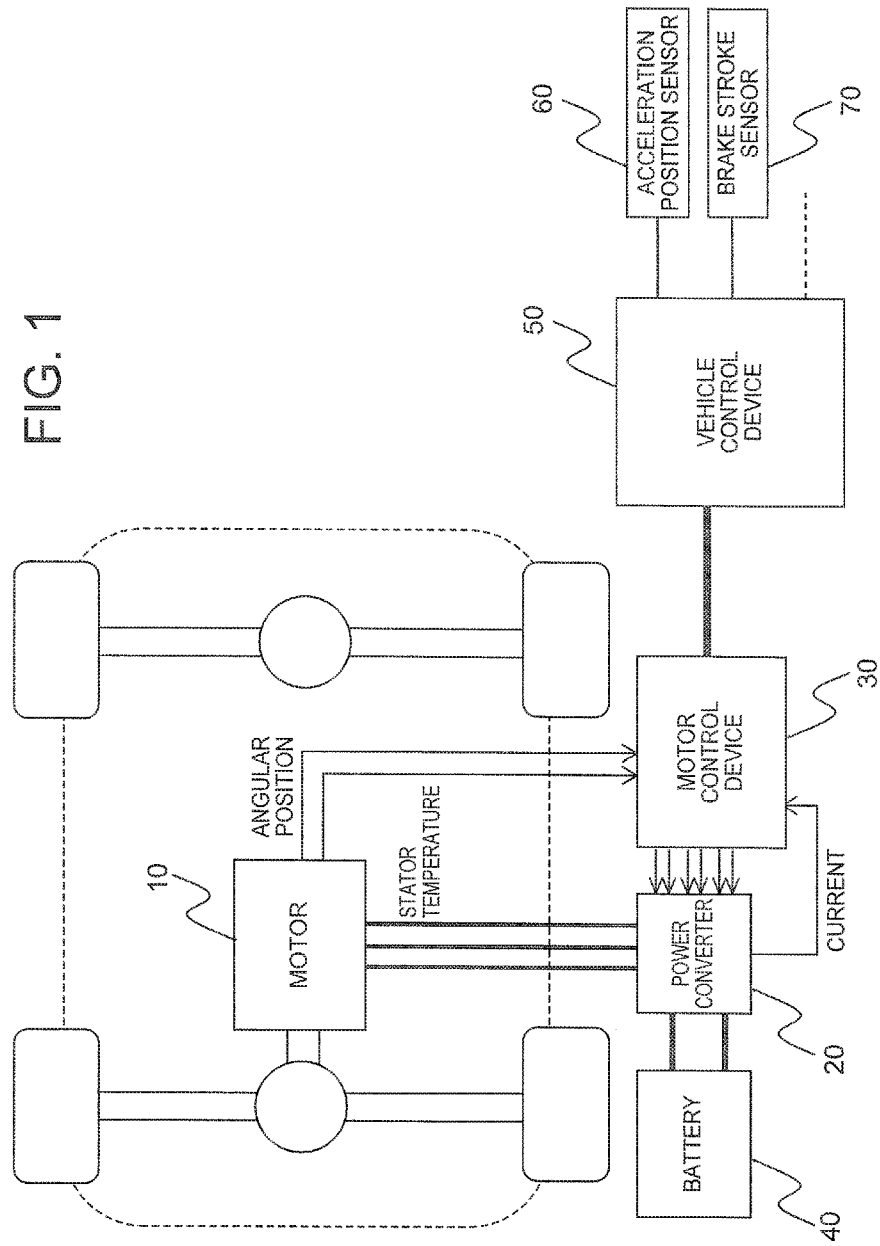
FIG. 1 is a block configuration diagram illustrating an electrically driven vehicle to which a motor control device according to a first embodiment of the present invention is applied.

Referring to the drawings, a motor control device and a motor control method according to an exemplary embodiment of the present invention are described below. In the drawings, the same or corresponding parts are denoted by the same reference symbols.

First Embodiment

FIG. 1 is a block configuration diagram illustrating an electrically driven vehicle to which a motor control device according to a first embodiment of the present invention is applied. In FIG. 1, the electrically driven vehicle includes a motor 10, a power converter 20, a motor control device 30, a battery 40, a vehicle control device 50, an accelerator position sensor (APS) 60, and a brake stroke sensor 70.

The motor 10 is coupled to a final gear (not shown) of the vehicle, and transmits drive power to an axle to drive the vehicle. The power converter 20 is an inverter for supplying the motor 10 with AC power for driving the motor 10. The power converter 20 includes six switching elements and a capacitor. For example, insulated gate bipolar transistors (IGBTs) or the like are used for the switching elements.

The motor control device 30 controls the power converter 20 so that the motor 10 may generate torque corresponding to a torque command output from the vehicle control device 50. In this case, for example, a controller area network (CAN) or the like is used to exchange information between the motor control device 30 and the vehicle control device 50.

Specifically, the motor control device 30 outputs an ON/OFF signal for controlling ON/OFF of the switching elements of the power converter 20 based on respective output signals from an angular position sensor that is mounted to the motor 10 for detecting an angular position of a rotor, a temperature sensor that is mounted to the motor 10 for detecting a temperature of a stator coil (stator temperature), and a current sensor that is provided to the power converter 20 for detecting a current flowing through the power converter 20.

The battery 40 supplies DC power to the power converter 20. As the battery 40, for example, a lithium ion battery or the like is used. The vehicle control device 50 determines the torque to be generated by the motor 10 based on a driver operation amount acquired from the accelerator position sensor 60 or the brake stroke sensor 70 and on vehicle states (for example, vehicle speed) acquired from other sensors (not shown).

The accelerator position sensor 60 detects an accelerator depressing amount performed by a driver to output the detected accelerator depressing amount to the vehicle control device 50. The brake stroke sensor 70 detects a brake depressing amount performed by the driver to output the detected brake depressing amount to the vehicle control device 50.

Figure 2:
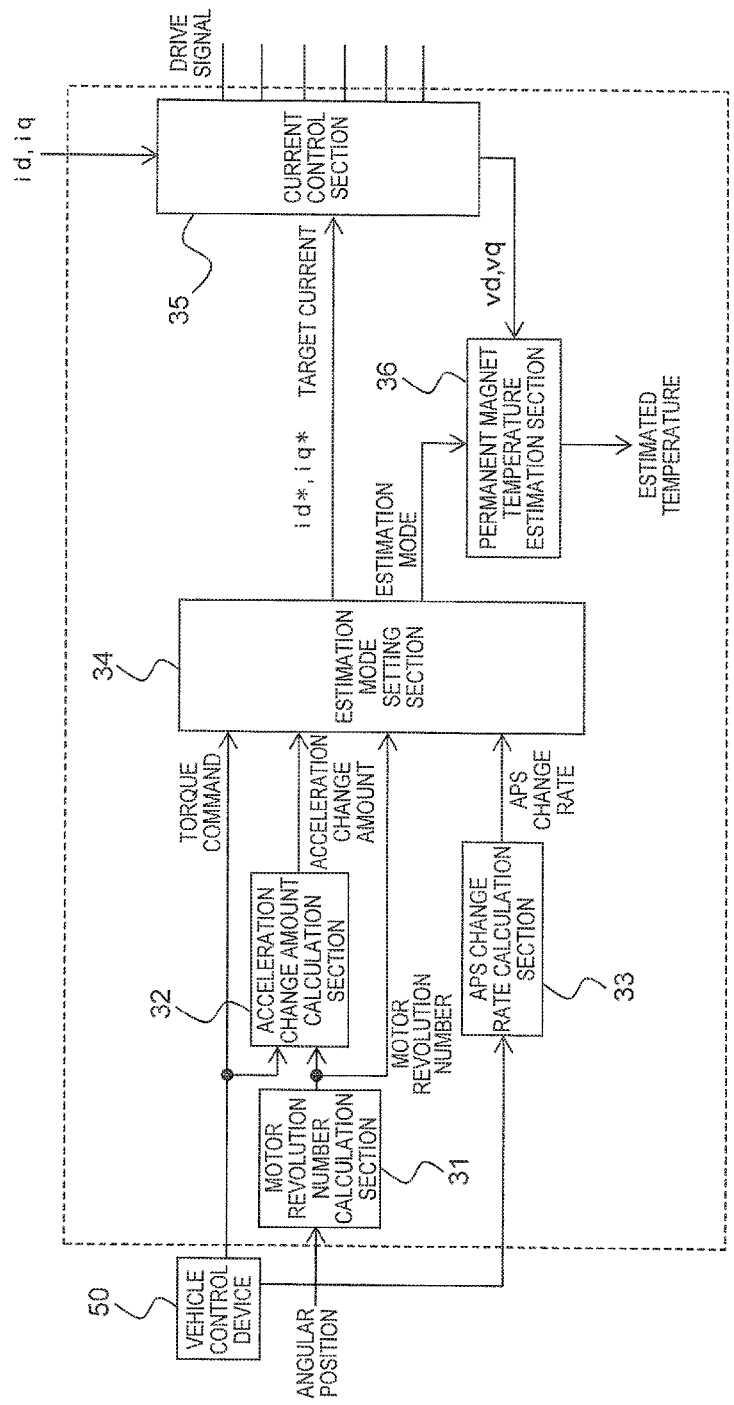
FIG. 2 is a block configuration diagram illustrating details of the motor control device of FIG. 1.

FIG. 2 is a block configuration diagram illustrating details of the motor control device 30 illustrated in FIG. 1. In FIG. 2, the motor control device 30 includes a motor revolution number calculation section 31, an acceleration change amount calculation section 32, an APS change rate calculation section 33, an estimation mode setting section 34, a current control section 35, and a permanent magnet temperature estimation section 36.

The motor revolution number calculation section 31 calculates a motor revolution number based on the angular position of the rotor detected by the angular position sensor. The acceleration change amount calculation section 32 calculates, based on the torque command output from the vehicle control device 50 and the motor revolution number calculated by the motor revolution number calculation section 31, an acceleration change amount that occurs when the motor torque is set to 0.

Specifically, as an example, the acceleration change amount calculation section 32 first calculates a vehicle speed Vs [m/s] based on a motor revolution number Nm [rpm] by using Expression (1). Note that, in Expression (1), r represents a tire radius and G represents a gear ratio.

$$Vs = Nm/(G \times 60) \times 2\pi r \quad (1)$$

Subsequently, the acceleration change amount calculation section 32 calculates a running resistance Fv based on a preset vehicle speed-running resistance map (function) by using Expression (2).

$$Fv = f(Vs) \quad (2)$$

Next, the acceleration change amount calculation section 32 calculates drive power Fm [N] obtained by motor torque based on a torque command Tm [Nm] of the motor 10 by using Expression (3).

$$Fm = Tm \times G/r \quad (3)$$

Subsequently, the acceleration change amount calculation section 32 calculates an acceleration change amount Δa that occurs when the motor torque is set to 0 based on the calculation results of Expressions (2) and (3) by using Expression (4). Note that, in Expression (4), m represents a vehicle weight.

$$\Delta a = (Fm - Fv)/m - Fv/m \quad (4)$$

Note that, the description above is given of the case where the acceleration change amount is calculated with use of the running resistance, but the present invention is not limited thereto. Depending on the running states of the vehicle, for example, when the running resistance is negligibly small, the running resistance expressed by Expression (2) may be set to 0 in a simplified manner, and the acceleration change amount may be calculated based only on the torque command.

The APS change rate calculation section 33 calculates an APS change rate based on a signal of the accelerator position sensor 60 (hereinafter referred to as "APS signal") output from the vehicle control device 50. Specifically, the APS change rate calculation section 33 calculates the time derivative of an APS value to calculate a change amount of the APS.

The estimation mode setting section 34 sets an estimation mode flag and calculates a target current based on the torque command output from the vehicle control device 50, the acceleration change amount output from the acceleration change amount calculation section 32, and the APS change rate output from the APS change rate calculation section 33.

The current control section 35 outputs an ON/OFF signal for controlling ON/OFF of the switching elements of the power converter 20 so that the current flowing through the motor 10 may follow the target current. The permanent magnet temperature estimation section 36 calculates a temperature of a permanent magnet to be used for the rotor of the motor 10 based on the motor revolution number output from the motor revolution number calculation section 31, the estimation mode flag output from the estimation mode setting section 34, and inverter command voltages vd and vq output from the current control section 35.

Figure 3:
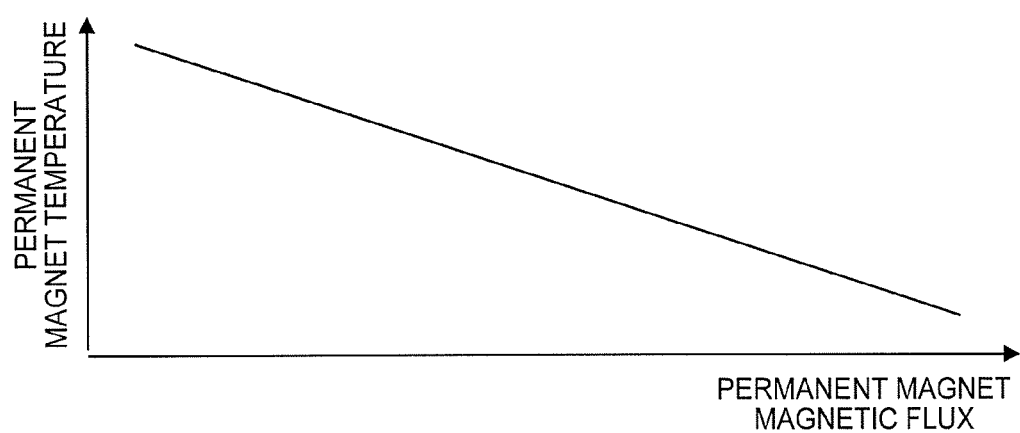
FIG. 3 is a graph showing temperature estimation processing to be executed in a permanent magnet temperature estimation section of the motor control device according to the first embodiment of the present invention.

Subsequently, the principle relating to estimation of the temperature of the permanent magnet in the permanent magnet temperature estimation section 36 is described with reference to FIG. 3. FIG. 3 is a graph showing temperature estimation processing in the permanent magnet temperature estimation section 36 of the motor control device according to the first embodiment of the present invention, and shows a relationship between the magnetic flux of the permanent magnet and the temperature of the permanent magnet.

First, a voltage equation representing a relationship between a voltage and a current on the dq axis of the motor 10 is expressed by Expression (5). Note that, in Expression (5), R represents a resistance value of the stator coil, Ld represents d-axis inductance, Lq represents q-axis inductance, ω represents an electric angular velocity of the motor, and Ψ represents an interlinkage magnetic flux of the permanent magnet.

[Math. 1]

$$\begin{bmatrix} v_d \\ v_q \end{bmatrix} = \begin{bmatrix} R & -\omega L_q \\ \omega L_d & R \end{bmatrix} \begin{bmatrix} i_d \\ i_q \end{bmatrix} + \begin{bmatrix} 0 \\ \omega \Psi \end{bmatrix} \quad (5)$$

Further, a torque expression representing a relationship between the torque generated by the motor 10 and the current on the dq axis is expressed by Expression (6). Note that, in Expression (6), T represents motor torque.

[Math. 2]

$$T = P_m(\Psi i_q + (L_d - L_q) i_d i_q) \quad (6)$$

In general, in the case of controlling the torque generated by the motor 10, a target value (id*, iq*) of a dq-axis current as the target current is calculated based on a target torque set value. Next, current control is performed so that a dq-axis current (id, iq) to be actually supplied to the motor 10 may have the target value (id*, iq*).

Note that, the dq-axis current (id, iq) to be actually supplied to the motor 10 is calculated based on an output value of the current sensor provided to the power converter 20 and an output value of the angular position sensor mounted to the motor 10.

In this case, in order to calculate an induced voltage (ωΨ) of the motor 10, the target value (id*, iq*) of the dq-axis current is set to 0 (that is, id*=0 and iq*=0). In this way, the dq-axis voltage command value becomes the value expressed by Expression (7), and the q-axis voltage command value matches with the induced voltage.

[Math. 3]

$$\begin{bmatrix} v_d \\ v_q \end{bmatrix} = \begin{bmatrix} 0 \\ \omega \Psi \end{bmatrix} \quad (7)$$

Finally, the interlinkage magnetic flux Ψ of the permanent magnet, which has the correlation with the temperature of the permanent magnet to be used for the rotor of the motor 10, is expressed by Expression (8). An estimated temperature of the permanent magnet is calculated, based on the interlinkage magnetic flux T obtained by Expression (8), from a map that is determined in advance based on characteristics of the motor 10.

[Math. 4]

$$\Psi = v_q/\omega \tag{8}$$

Note that, in the above description, the target value (id*, iq*) of the dq-axis current is set to 0, but the present invention is not limited thereto. Control may be executed so that the dq-axis current (id, iq) to be actually supplied to the motor 10 is set to 0. In the case where the target value (id*, iq*) of the dq-axis current is set to 0, this value can be promptly referred to because the estimation mode setting section 34 itself has the value. In the case where the dq-axis current (id, iq) to be actually supplied to the motor 10 is set to 0, control with a small error can be executed.

Further, the setting of the target value (id*, iq*) of the dq-axis current to 0 or the setting of the dq-axis current (id, iq) to be actually supplied to the motor 10 to 0 is equivalent to the setting of the motor torque to 0 as a result.

In this way, the temperature of the permanent magnet can be calculated without using any motor constant under the state in which the target current (id*, iq*) is 0, that is, the torque is 0. Consequently, the temperature of the permanent magnet to be used for the rotor of the motor can be highly accurately estimated.

Figure 4:
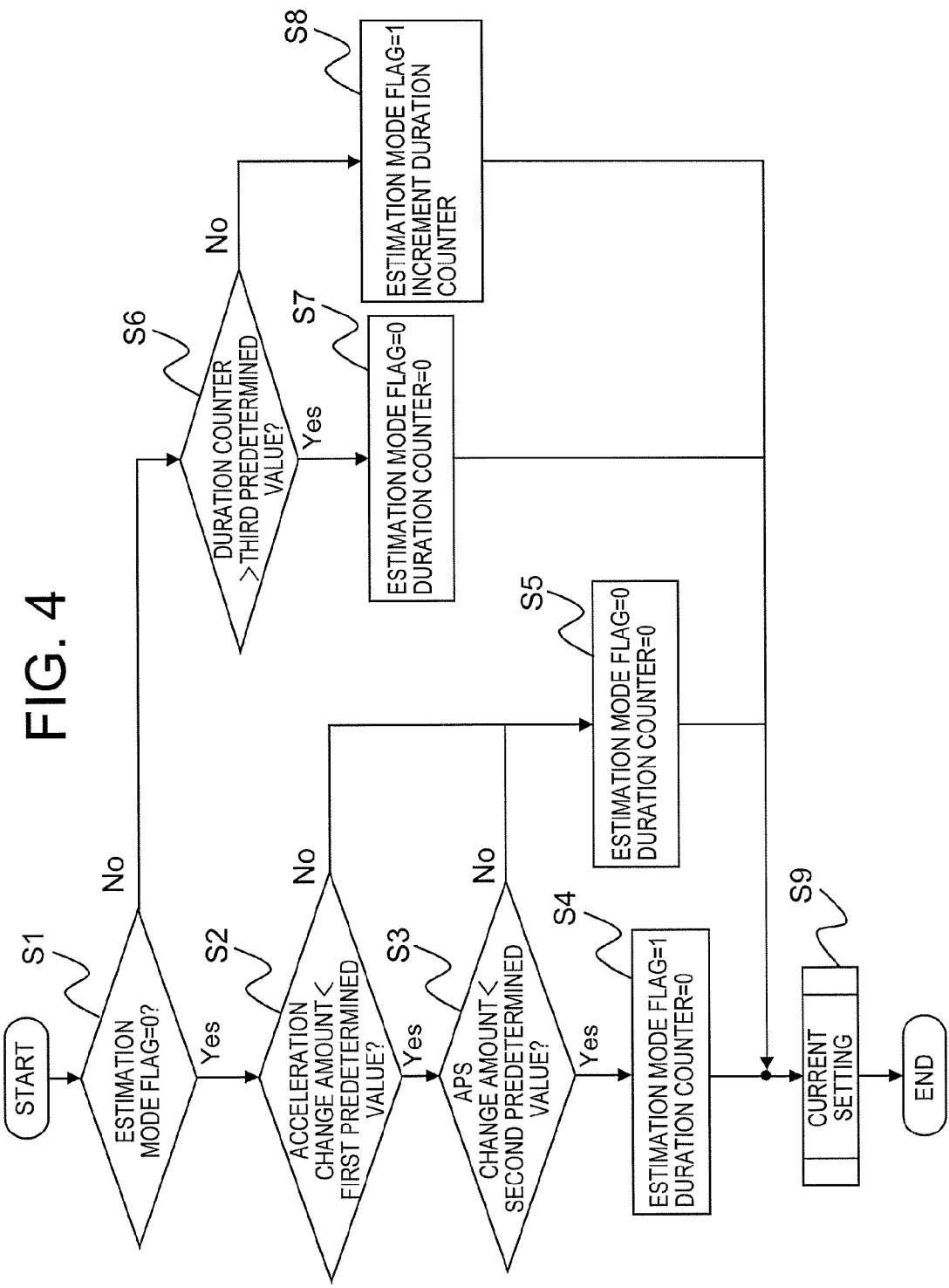
FIG. 4 is a flowchart illustrating estimation mode determination processing to be executed in an estimation mode setting section of the motor control device according to the first embodiment of the present invention.

Next, processing of determining the estimation mode by the estimation mode setting section 34 is described with reference to a flowchart of FIG. 4. FIG. 4 is a flowchart illustrating the estimation mode determination processing in the estimation mode setting section 34 of the motor control device according to the first embodiment of the present invention, which is repeatedly executed in a calculation cycle of 1 [ms], for example.

First, the estimation mode setting section 34 determines whether or not the estimation mode flag is 0 (Step S1). In this case, the estimation mode flag is determined by referring to the value stored in the previous processing.

When it is determined in Step S1 that the estimation mode flag is 0 (that is, Yes) and the estimation mode is not currently executed, the estimation mode setting section 34 determines whether or not the acceleration change amount calculated by the acceleration change amount calculation section 32 is smaller than a preset first predetermined value (Step S2).

Note that, in the case where the acceleration change amount calculation section 32 calculates the acceleration change amount by setting the running resistance to 0 in a simplified manner as described above, the condition for executing the estimation mode is equivalent to the case where the absolute value of the torque is small.

When it is determined in Step S2 that the acceleration change amount is smaller than the first predetermined value (that is, Yes), the estimation mode setting section 34 determines whether or not the APS change rate calculated by the APS change rate calculation section 33 is smaller than a preset second predetermined value (Step S3).

When it is determined in Step S3 that the APS change rate is smaller than the second predetermined value (that is, Yes), the estimation mode setting section 34 sets the estimation mode flag to 1 to start the estimation mode, and clears a duration counter for counting the duration of the estimation mode to 0 (Step S4).

On the other hand, when it is determined in Step S2 that the acceleration change amount is equal to or larger than the first predetermined value (that is, No), or when it is determined in Step S3 that the APS change rate is equal to or larger than the second predetermined value (that is, No), the estimation mode setting section 34 maintains the estimation mode flag to 0, and clears the duration counter to 0 (Step S5).

On the other hand, when it is determined in Step S1 that the estimation mode flag is 1 (that is, No) and the estimation mode is currently executed, the estimation mode setting section 34 determines whether or not the duration counter is equal to or larger than a third predetermined value at which the estimation mode is finished (Step S6).

When it is determined in Step S6 that the duration counter is equal to or larger than the third predetermined value (that is, Yes), the estimation mode setting section 34 sets the estimation mode flag to 0 to finish the estimation mode, and clears the duration counter for counting the duration of the estimation mode to 0 (Step S7).

On the other hand, when it is determined in Step S6 that the duration counter is smaller than the third predetermined value (that is, No), the estimation mode setting section 34 maintains the estimation mode flag to 1, and increments the duration counter (Step S8).

Subsequently, the estimation mode setting section 34 sets the target current (id*, iq*) in accordance with the state of the estimation mode flag (Step S9), and finishes the processing of FIG. 4.

In this case, the above-mentioned first to third predetermined values are set as follows, for example.

As the first predetermined value, such an acceleration change amount that gives no sense of discomfort to the driver when the torque is switched to 0 is determined by an experiment or the like.

As the second predetermined value, such an APS change amount that gives no sense of discomfort to the driver when the torque is switched to 0 is determined by an experiment or the like.

As the third predetermined value, the time period necessary for the currents id and iq to be stable at 0 is set.

In the above description, the estimation mode flag is set to 1 when the acceleration change amount is smaller than the first predetermined value in Step S2 and when the APS change rate is smaller than the second predetermined value in Step S3. However, the present invention is not limited thereto, and the estimation mode flag may be set to 1 when the acceleration change amount is smaller than the first predetermined value or when the APS change rate is smaller than the second predetermined value. In any case, the temperature of the permanent magnet can be estimated without giving any sense of discomfort to the driver.

Alternatively, the estimation mode flag may be set to 1 when a change amount (derivative value) of the torque command instead of the APS change rate is smaller than a preset predetermined value. In this case, the temperature of the permanent magnet can be estimated without requiring the motor control device 30 to acquire the APS signal from the vehicle control device 50 (without the need of any new sensor information) and without giving any sense of discomfort to the driver.

Figure 5:
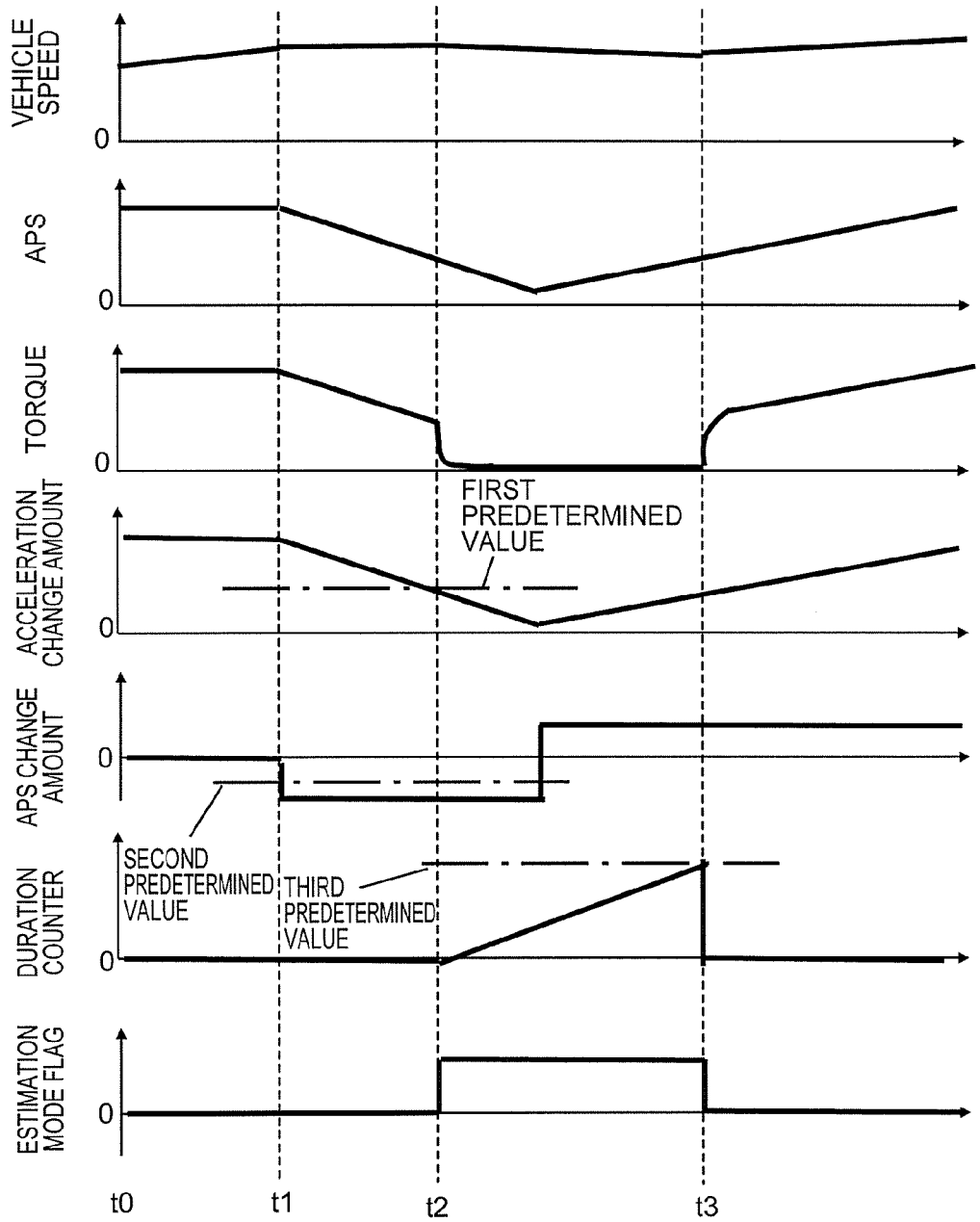
FIG. 5 is a timing chart illustrating a behavior when the temperature estimation processing is executed in the motor control device according to the first embodiment of the present invention.

Next, the case of estimating the temperature of the permanent magnet is described with reference to FIG. 5. FIG. 5 is a timing chart illustrating the behavior when the temperature estimation processing is executed in the motor control device according to the first embodiment of the present invention.

First, in the period between times t0 and t1 during which the condition for executing the estimation mode is not established, the torque is determined in accordance with the APS.

Next, the period between times t1 and t2 corresponds to the state in which the accelerator pedal is gradually released, and the APS change amount becomes negative. In this case, the APS change amount is smaller than the second predetermined value but the acceleration change amount is larger than the first predetermined value, and hence the processing does not transition to the estimation mode.

Subsequently, at the time t2, the accelerator pedal is further released, and the acceleration change amount becomes smaller than the first predetermined value. In this case, both of the APS change amount and the acceleration change amount satisfy the condition of transition to the estimation mode, and hence the estimation mode is executed.

Next, in the period between times t2 and t3 during which the estimation mode is established, the target current (id*, iq*) is set to 0, and the torque becomes 0. At this time, the induced voltage is calculated at this timing, and the temperature of the permanent magnet is estimated.

Subsequently, at the time t3 at which the duration counter exceeds the third predetermined value, the estimation mode is finished.

Next, in the period after a time t4 during which the condition for executing the estimation mode is not established, the torque is determined in accordance with the APS.

Note that, in FIG. 5, the driver depresses the accelerator pedal in the period between the times t2 and t3 during which the estimation mode is executed. At this time, the estimation mode is suspended if importance is placed on the drivability, whereas the estimation mode is continued if importance is placed on the estimation of the temperature of the permanent magnet.

Figure 6:
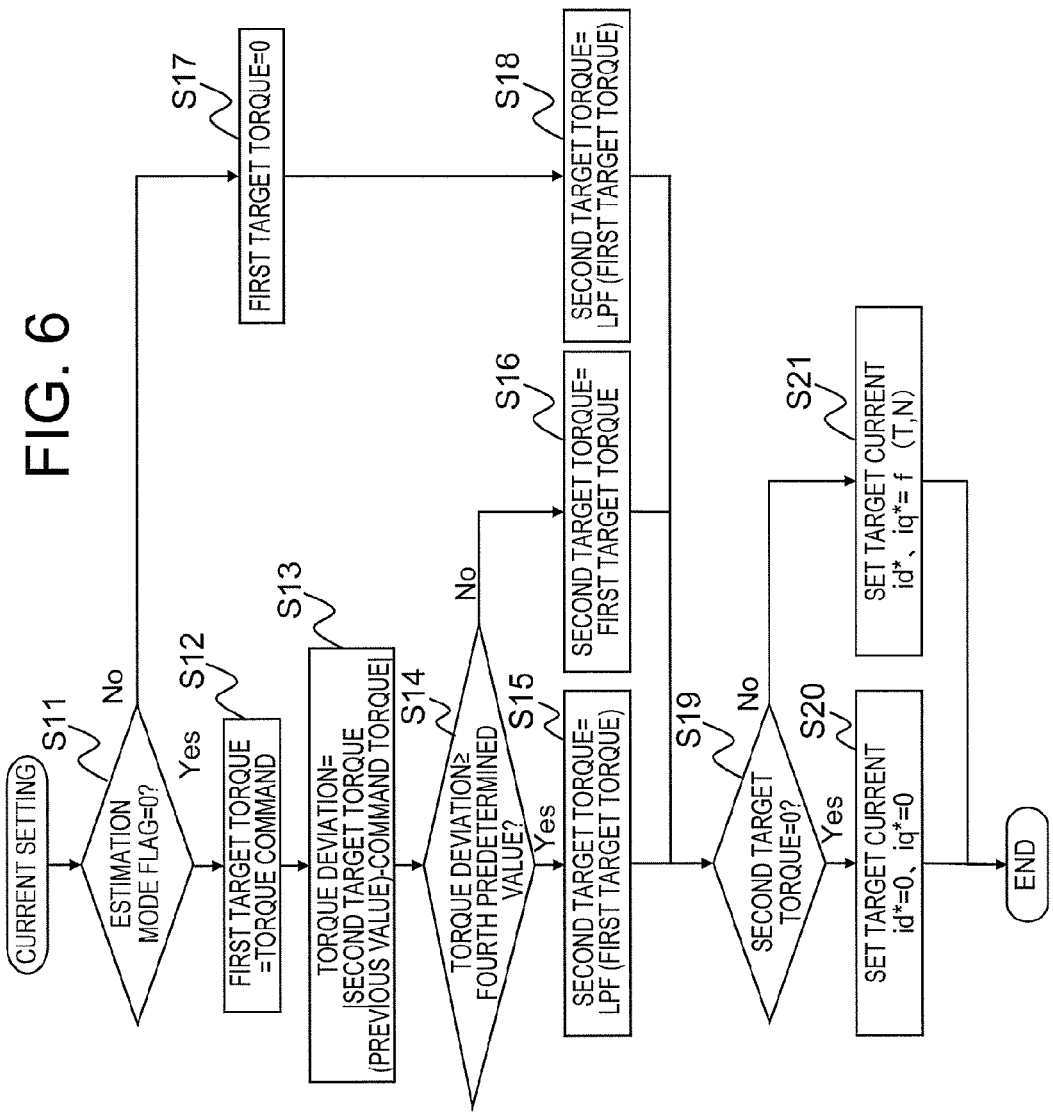
FIG. 6 is a flowchart illustrating target current setting processing to be executed in the estimation mode setting section of the motor control device according to the first embodiment of the present invention.

Subsequently, the processing of setting the target current (id*, iq*) shown in Step S9 of FIG. 4 is described with reference to a flowchart of FIG. 6. FIG. 6 is a flowchart illustrating the target current setting processing in the estimation mode setting section 34 of the motor control device according to the first embodiment of the present invention. Note that, the processing illustrated in FIG. 6 is called from the flowchart illustrated in FIG. 4, and hence the calculation cycle depends on an upper function.

First, the estimation mode setting section 34 determines whether or not the estimation mode flag is 0 (Step S11). In this case, the result of determination in the flowchart illustrated in FIG. 4 is used for the estimation mode flag.

When it is determined in Step S11 that the estimation mode flag is 0 (that is, Yes) and the estimation mode is not currently executed, the estimation mode setting section 34 sets the torque command output from the vehicle control device 50 as a first target torque (Step S12).

Subsequently, the estimation mode setting section 34 calculates a torque deviation as "torque deviation=|second target torque (previous value)−command torque|" (Step S13). In this case, the value in the previous calculation step is used for the second target torque (previous value). Further, || represents absolute value processing.

Next, the estimation mode setting section 34 determines whether or not the torque deviation calculated in Step S13 is equal to or larger than a preset fourth predetermined value (Step S14). Note that, the fourth predetermined value is a value that is set for extracting the case where the second target torque matches with the torque command, and, for example, the value of 1% of the command torque is set.

When it is determined in Step S14 that the torque deviation is equal to or larger than the fourth predetermined value (that is, Yes), the estimation mode setting section 34 sets a value obtained by subjecting the first target torque to low-pass filtering (LPF) as the second target torque (Step S15).

On the other hand, when it is determined in Step S14 that the torque deviation is smaller than the fourth predetermined value (that is, No), the estimation mode setting section 34 sets the first target torque as the second target torque (Step S16).

On the other hand, when it is determined in Step S11 that the estimation mode flag is 1 (that is, No) and the estimation mode is currently executed, the estimation mode setting section 34 sets 0 as the first target torque (Step S17).

Subsequently, the estimation mode setting section 34 sets the value obtained by subjecting the first target torque to low-pass filtering (LPF) as the second target torque (Step S18).

Next, the estimation mode setting section 34 determines whether or not the second target torque is 0 (Step S19).

When it is determined in Step S19 that the second target torque is 0 (that is, Yes), the estimation mode setting section 34 sets the target current (id*, iq*) to 0 (that is, id*=0 and iq*=0) (Step S20), and the processing of FIG. 6 is finished.

On the other hand, when it is determined in Step S19 that the second target torque is not 0 (that is, No), the estimation mode setting section 34 sets the target current (id*, iq*) to a value corresponding to the second target torque and the motor revolution number (Step S21), and the processing of FIG. 6 is finished.

Note that, a cutoff frequency of the low-pass filter in Steps S15 and S18 is set to a value falling within the range where torsional resonance that occurs due to drive shaft stiffness does not occur due to the change in torque (for example, approximately several Hz).

Figure 7:
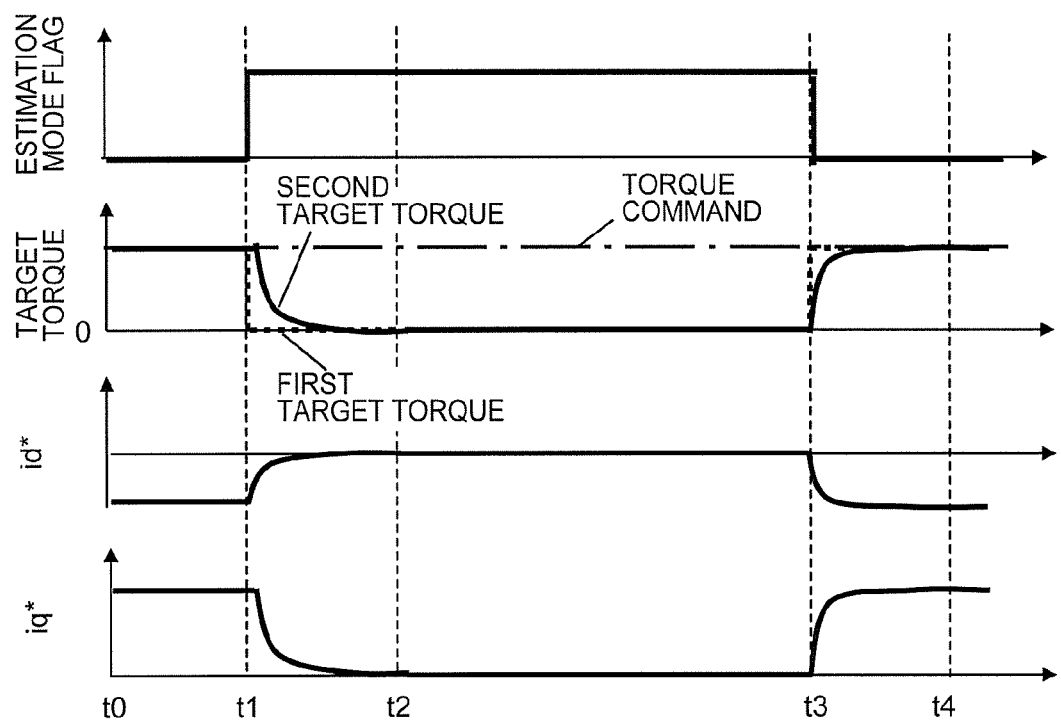
FIG. 7 is a timing chart illustrating a behavior of torque and current when an estimation mode is executed in the motor control device according to the first embodiment of the present invention.

Next, the behavior of the torque and the current when the estimation mode is executed is described with reference to FIG. 7. FIG. 7 is a timing chart illustrating the behavior of the torque and the current when the estimation mode is executed in the motor control device according to the first embodiment of the present invention.

First, in the period between times t0 and t1 during which the estimation mode is not executed, the first target torque matches with the torque command output from the vehicle control device 50.

Next, in the period between times t1 and t2 immediately after the start of the estimation mode, the second target torque approaches gradually 0 due to the low-pass filtering.

Subsequently, in the period between times t2 and t3 during which the temperature of the permanent magnet is estimated, the target current (id*, iq*) is set to 0.

Next, in the period between times t3 and t4 during which the estimation mode is finished and the second target torque returns to the torque command, the first target torque matches with the torque command. At this time, the second target torque is subjected to the low-pass filtering with respect to the first target torque.

Subsequently, after a time t4, the second target torque matches with the torque command, and the estimation mode is finished.

From FIGS. 6 and 7, through the setting of the value obtained by subjecting the first target torque to the low-pass filtering (LPF) as the second target torque, resonance due to shaft oscillation can be prevented, and the temperature of the permanent magnet can be estimated without giving any sense of discomfort to the driver.

Note that, in the above description, the value obtained by subjecting the first target torque to the low-pass filtering (LPF) is set. However, the present invention is not limited thereto, and, in the case where the target torque is changed to 0, by applying gradient limitation so that the torque is changed by only 5 [N] in 1 [s], for example, the temperature of the permanent magnet can be estimated without giving any sense of discomfort to the driver similarly.

As described above, according to the first embodiment, the estimation mode setting section sets, when the predetermined condition for estimating the temperature of the permanent magnet to be used for the rotor of the motor is established under the state in which the motor generates drive power to run the vehicle, the current flowing through the motor to 0, and the permanent magnet temperature estimation section estimates the temperature of the permanent magnet based on the induced voltage of the motor in the period during which the current flowing through the motor is 0.

Further, according to the first embodiment, in the determination step, it is determined whether or not the predetermined condition for estimating the temperature of the permanent magnet to be used for the rotor of the motor is established under the state in which the motor generates drive power to run the vehicle, and in the current control step, when the predetermined condition is established, the current flowing through the motor is set to 0. In the temperature estimation step, in the period during which the current flowing through the motor is 0, the temperature of the permanent magnet is estimated based on the induced voltage of the motor.

In this manner, the temperature of the permanent magnet can be calculated without using any motor constant under the state in which the target current is 0, that is, the torque is 0.

Consequently, the motor control device and the motor control method capable of highly accurately estimating the temperature of the permanent magnet to be used for the rotor of the motor can be obtained.

The invention claimed is:

1. A motor control device for a vehicle comprising a motor as a drive power source, the motor control device comprising:
   an acceleration change amount calculation section configured to calculate a change amount of acceleration of the vehicle;
   an estimation mode setting section configured to, when the change amount of the acceleration that occurs when torque of the motor is set to zero, becomes equal to or less than a predetermined value under a state in which the motor generates drive power to run the vehicle, set a current flowing through the motor to zero; and
   a permanent magnet temperature estimation section configured to estimate a temperature of a permanent magnet to be used for a rotor of the motor, based on an induced voltage of the motor in a period during which the current flowing through the motor is zero.

2. The motor control device according to claim 1, wherein the estimation mode setting section is further configured to, when a change rate of a depressing amount of an accelerator pedal of the vehicle that is output from an accelerator position sensor configured to detect the depressing amount of the accelerator pedal of the vehicle, becomes equal to or less than a predetermined value, set the current flowing through the motor to zero.

3. The motor control device according to claim 1, wherein the estimation mode setting section is further configured to, when a change amount of a torque command, that is output from a vehicle control device configured to control the torque that is generated by the motor, becomes equal to or less than a predetermined value, set the current flowing through the motor to zero.

4. The motor control device according to claim 1, wherein the estimation mode setting section is further configured to, when the current flowing through the motor is set to zero, perform low-pass filtering on a torque command that is output from a vehicle control device configured to control the torque that is generated by the motor, to thereby reduce the torque of the motor.

5. The motor control device according to claim 2, wherein the estimation mode setting section is further configured to, when the current flowing through the motor is set to zero, perform low-pass filtering on a torque command that is output from a vehicle control device configured to control the torque that is generated by the motor, to thereby reduce the torque of the motor.

6. The motor control device according to claim 3, wherein the estimation mode setting section is further configured to, when the current flowing through the motor is set to zero, perform low-pass filtering on a torque command that is output from a vehicle control device configured to control the torque that is generated by the motor, to thereby reduce the torque of the motor.

7. The motor control device according to claim 1, wherein the estimation mode setting section is further configured to, when the current flowing through the motor is set to zero, apply gradient limitation to a torque command that is output from a vehicle control device configured to control the torque that is generated by the motor, to thereby reduce the torque of the motor.

8. The motor control device according to claim 2, wherein the estimation mode setting section is further configured to, when the current flowing through the motor is set to zero, apply gradient limitation to a torque command that is output from a vehicle control device configured to control the torque that is generated by the motor, to thereby reduce the torque of the motor.

9. The motor control device according to claim 3, wherein the estimation mode setting section is further configured to, when the current flowing through the motor is set to zero, apply gradient limitation to a torque command that is output from a vehicle control device configured to control the torque that is generated by the motor, to thereby reduce the torque of the motor.

10. The motor control device according to claim 1, wherein the estimation mode setting section is further configured to set the current flowing through the motor to zero when the change amount of the acceleration that occurs when the torque of the motor is set to zero, becomes equal to or less than the predetermined value under the state in which the motor generates the drive power to run the vehicle, and when a change rate of a depressing amount of an accelerator pedal of the vehicle that is output from an accelerator position sensor configured to detect the depressing amount of the accelerator pedal of the vehicle, becomes equal to or less than a predetermined value.

11. A motor control method to be executed by a motor control device for a vehicle comprising a motor as a drive power source, the motor control method comprising:
   calculating a change amount of acceleration of the vehicle;
   determining whether the change amount of the acceleration that occurs when torque of the motor is set to zero, becomes equal to or less than a predetermined value under a state in which the motor generates drive power to run the vehicle;

setting a current flowing through the motor to zero when the change amount of the acceleration that occurs when the torque of the motor is set to zero, becomes equal to or less than the predetermined value under the state in which the motor generates the drive power to run the vehicle; and estimating a temperature of a permanent magnet to be used for a rotor of the motor, based on an induced voltage of the motor in a period during which the current flowing through the motor is zero.

* * * * *